United States Patent [19]

Nomura et al.

[11] Patent Number: 4,867,501

[45] Date of Patent: Sep. 19, 1989

[54] AUTOMOTIVE DOOR HANDLE

[75] Inventors: Syosuke Nomura; Shinshi Kajimoto; Susumu Okazaki; Takeshi Yamamoto, all of Hiroshima, Japan

[73] Assignee: Mazda Motor Corporation, Hiroshima, Japan

[21] Appl. No.: 213,892

[22] Filed: Jun. 30, 1988

[30] Foreign Application Priority Data

Jul. 2, 1987 [JP] Japan ................................ 62-166421

[51] Int. Cl.[4] ................................................ B60J 5/04

[52] U.S. Cl. .................................. 296/146; 292/336.3

[58] Field of Search ...................... 296/146; 16/110 R; 292/336.3 X, 347

[56] References Cited

U.S. PATENT DOCUMENTS

| | | | |
|---|---|---|---|
| 3,508,778 | 4/1970 | Legge et al. | 292/336.3 |
| 4,591,204 | 5/1986 | Gallitzendoerfer | 296/146 |
| 4,703,963 | 11/1987 | Ball | 292/336.3 |
| 4,766,660 | 8/1988 | La Rose | 296/146 |

*Primary Examiner*—Robert R. Song

*Attorney, Agent, or Firm*—Sixbey, Friedman, Leedom & Ferguson

[57] ABSTRACT

A vehicle is provided with a beltline lace extending in the longitudinal direction of the vehicle body on the side of the vehicle body through the outer side a door. The beltline lace is cut at a part of the door. A door handle for releasing the door lock mechanism is positioned at the beltline lace cut part of the door at which the belt line lace is cut.

16 Claims, 6 Drawing Sheets

AUTOMOTIVE DOOR HANDLE

BACKGROUND OF THE INVENTION

1. Field of the Invention

This invention relates to an automotive door handle.

2. Description of the Prior Art

Conventionally a door handle for a vehicle is directly mounted in a cutaway portion formed in a flat outer surface of a door formed of steel plate as disclosed in Japanese Unexamined Patent Publication No. 60(1985)-51276, for instance. Accordingly, the conventional door handle is disadvantageous in the following points.

First since a door handle having an image different from that of the door surface is conspicuously exposed in the door surface, freedom in body design is limited. Second since a door handle outwardly projects from the door surface or a recess for giving access to the back surface of the door handle is formed, the smoothness of the door surface is deteriorated to adversely affect the aerodynamic performance of the vehicle.

SUMMARY OF THE INVENTION

In view of the foregoing observations and description, the primary object of the present invention is to provide an automotive door handle for a vehicle having a beltline lace which is free from the aforesaid drawbacks inherent to the conventional door handle.

In accordance with the present invention, there is provided a door handle to be provided on a door of a vehicle for releasing a door lock mechanism characterized in that the vehicle is provided with a beltline lace extending in the longitudinal direction of the vehicle body on the side of the vehicle body through the outer side of the door, the beltline lace being cut at a part of the door, and said door handle is positioned at the beltline lace cut part of the door at which the belt line lace is cut.

DESCRIPTION OF THE PREFERRED EMBODIMENT

Figure 1:
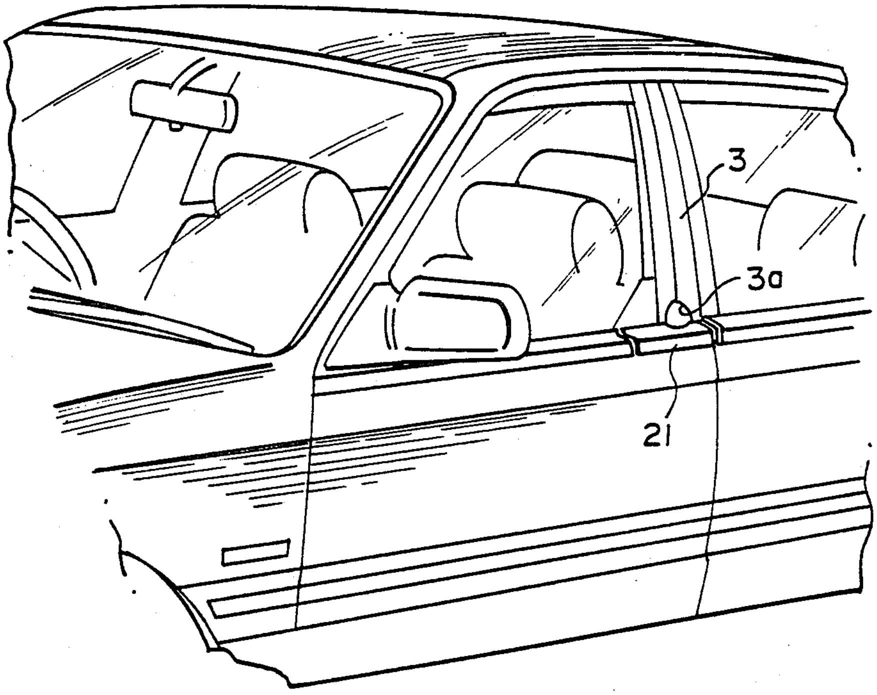
FIG. 1 is an outside view of a part of a vehicle provided with a door handle in accordance with an embodiment of the present invention.
Figure 3:
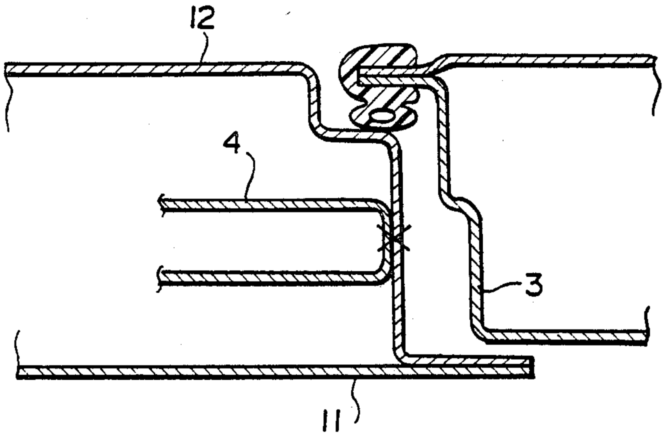
FIG. 3 is a cross-sectional view taken along line III—III in FIG. 2.
Figure 2:
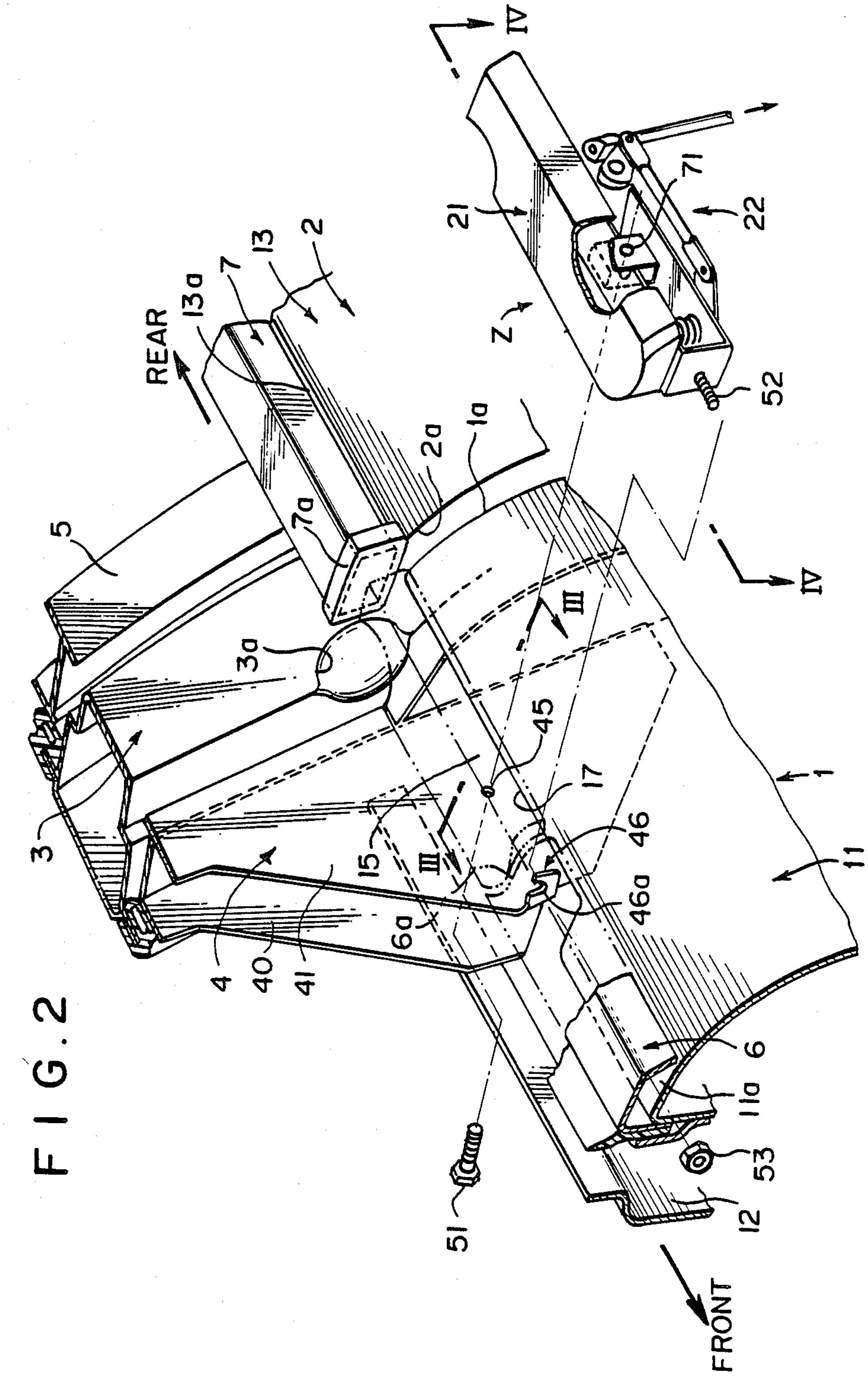
FIG. 2 is a fragmentary perspective view of a part of the vehicle partly exploded.

In FIGS. 1 and 2, a left front door 1 of a vehicle comprises an outer panel 11, a inner panel 12 and a front door sash 4 sandwiched between the outer panel 11 and the panel 12. A left rear door 2 has an outer panel 13 and a inner door sash 5. A center pillar 3 separates the opening to be closed by the front door 1 and the opening to be closed by the rear door 2.

A front beltline lace 6 is mounted on the outer panel 11 of the front door 1 to extend in the longitudinal direction of the vehicle body along the upper edge 11*a* of the outer panel 11, and a rear beltline lace 7 is mounted on the outer panel 13 of the rear door 2 to extend in the longitudinal direction of the vehicle body along the upper edge 13*a* of the outer panel 13. Both the front belt line lace 6 and the rear beltline lace 7 are shaped, in cross-section, like a channel open downward, and are in alignment with each other. The outer lower end of the front beltline lace 6 rests on the upper edge portion of the outer panel 11. Generally it is preferred that the front beltline lace 6 and the rear beltline lace 7 are opposed to each other at the rear ends 1*a* of the front door 1 and the front end 2*a* of the rear door 2 so that they look like a single continuous beltline lace. However, in this embodiment, the rear end 6*a* of the front beltline lace 6 is forwardly spaced from the rear end 1*a* of the front door 1 and thus a beltline lace cut portion 15 is formed. A cutaway portion 17 is formed in the upper edge 11*a* of the outer panel 11 of the front door 1 at the portion corresponding to the beltline lace cut portion 15 in order to receive a door handle assembly Z to be described later. Said front door sash 4 is substantially channel-shaped in cross-section and has an inner plate portion 40 and an outer plate portion 41. The outer plate portion 41 is provided with a through hole 45 for fixing the door handle assembly Z, and a flange portion 46 bent outward from the free end of the outer plate portion 41. A U-shaped cutaway portion 46*a* is formed in the flange portion 46 for fixing the door handle assembly Z.

As shown in FIGS. 2 to 9, the door handle assembly Z comprises a door handle 21 and a connecting mechanism 22 for transmitting movement of the door handle 21 to a door lock mechanism which is of a known structure and is not shown.

The door handle 21 is a lever member having an width and length conforming to the beltline lace cut portion 15. The height of the door handle 21 is substantially equal to the front beltline lace 6 and the rear beltline lace 7. The door handle 21 is provided at one end 21*a* with a boss portion 26 for mounting a door handle support shaft 61 of the connecting mechanism 22. The door handle 21 is further provided at the other end 21*b* with a recess 25 for applying a finger.

The connecting mechanism 22 includes a mounting base 60 which is of a block substantially channel-shaped in cross-section. The mounting base 60 is provided with a threaded, hole 71 in the inner side wall 60*a* thereof and with a fixed bolt 62 at the front end face 60*b* thereof. The mounting base 60 is inserted into the cutaway portion 17 in the outer panel, 11 through the beltline lace cut portion 15 and is firmly secured to the front door 1 by way of the front door sash 4 by screwing a bolt 51 into the threaded hole 71 through a through hole 45 in the sash 4 and by engaging the fixed bolt 52 with the U-shaped cutaway portion 46*a* and screwing a nut 53 on the fixed bolt 52. As clearly shown in FIG. 3, the rear edge portions of the outer and inner panels 11 and 12 of the front door 1 are welded together and extend rearward to overlap the outer surface of the body panel defining the opening to be closed by the front door, i.e., the center pillar 3 in this particular embodiment. The door handle 21 is positioned to cover the rear edge portions of the outer and inner panels 11 and 12 with the rear end face of the door handle 21 being substantially in alignment with the rear end face of the outer panel 11. Further, the center pillar 3 is provided with a recess 3*a* at a part opposed to the recess 25 of the door handle 21 when the door handle 21 is at rest in order to facilitate application of a finger to the recess 25.

The door handle support shaft 61 is mounted on one end portion of the mounting base 60 to vertically extend therethrough. The upper end portion of the door handle support shaft 61 is provided with splines 62. The splines 62 is in mesh with a splined hole 27 formed in the boss portion 26 of the door handle 21, whereby the door handle 21 is connected to the connecting mechanism 22.

The door handle support shaft 61 is normally urged in the direction of arrow A (FIG. 4) by a spring 63. A first lever 64 is fixed at one end thereof to the lower end portion of the door handle support shaft 61, and one end of a connecting lever 65 is pivotally mounted on the other end of the first lever 64. The other end of the connecting lever 65 is pivotally mounted on one end 67*a* of a second lever 67 which is pivotally mounted on the mounting base 60 by a pivot 66. The other end 67*b* of the second lever 67 is pivotally mounted on one end 68*a* of a rod 68. The other end 68*b* of the rod 68 is connected to the door lock mechanism (not shown).

Figure 4:
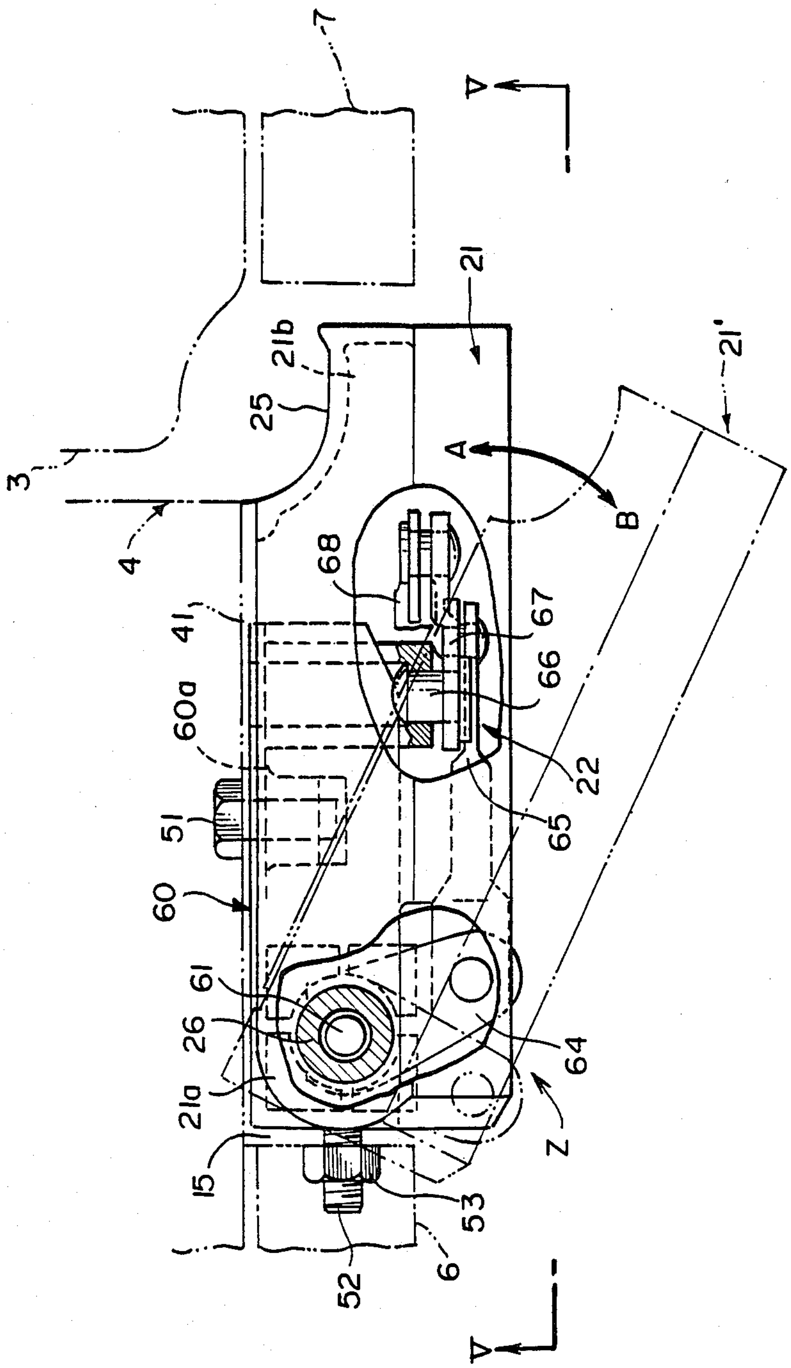
FIG. 4 is a cross-sectional view taken along line IV—IV in FIG. 2.
Figure 5:
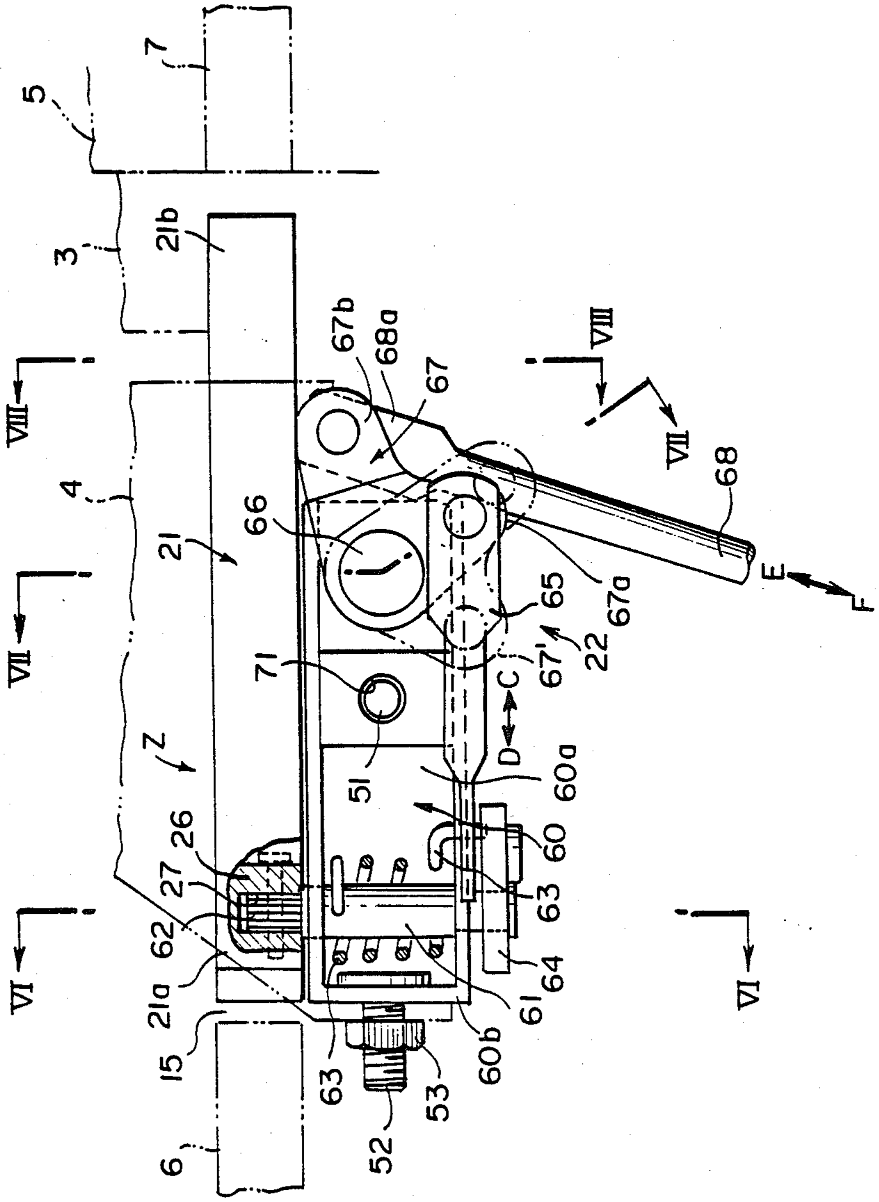
FIG. 5 is a cross-sectional view taken along line V—V in FIG. 4.
Figure 6:
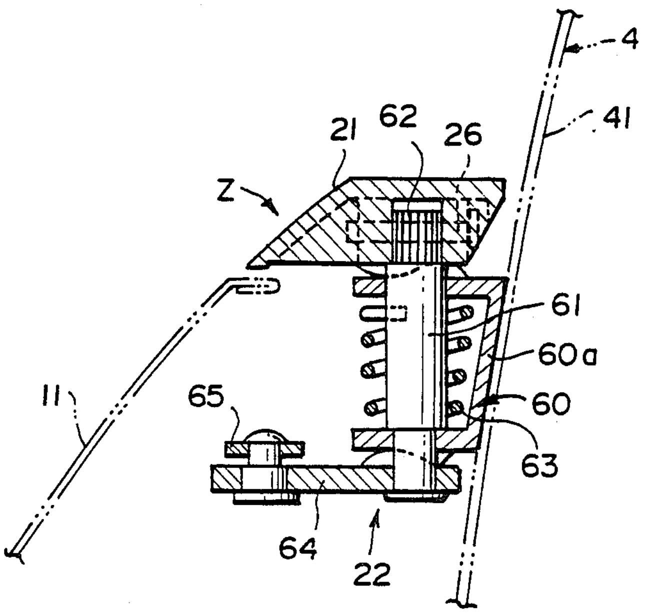
FIG. 6 is a cross-sectional view taken along line VI—VI in FIG. 5.
Figure 7:
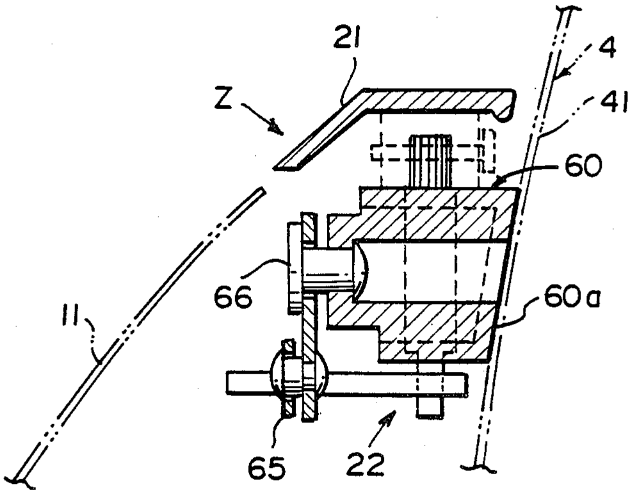
FIG. 7 is a cross-sectional view taken along line VII—VII in FIG. 5.
Figure 8:
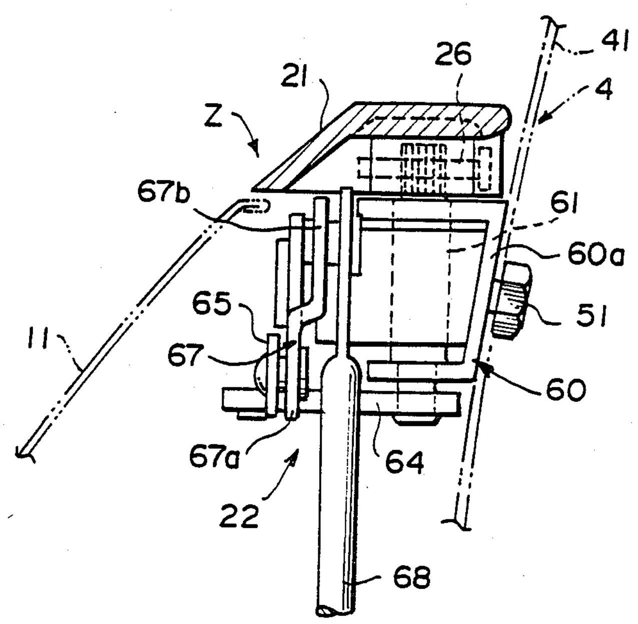
FIG. 8 is a cross-sectional view taken along line VIII—VIII in FIG. 5.

In the door handle assembly Z described above, the door handle 21 is in alignment with the front beltline lace 6 and the rear beltline lace 7 and looks like a part of a single beltline lace when the door handle 21 is at rest as shown in FIGS. 4 and 5.

When the door handle 21 is pivoted in the direction of arrow B in FIG. 2, the door handle support shaft 61 is rotated to pull the connecting lever 65 in the direction of arrow D in FIG. 5. Accordingly, the second lever 67 is pivoted from the position shown by the solid line in FIG. 5 to the position shown by the chain line, thereby pushing the rod 68 in the direction of arrow F in FIG. 5 to cause the rod 68 to release the door lock mechanism and to open the door.

When the door handle 21 is released, the rod 68 is pulled in the direction of arrow E under the force of the spring 63 urging the door handle support shaft 61.

As can be understood from the description above, when the door handle 21 is at rest, the door handle 21 looks as if it forms a single continuous beltline lace together with the front beltline lace 6 and the rear beltline lace 7. Accordingly, the door handle 21 is not so conspicuous in the front door 1 and the vehicle body design can be effected without minding the presence of the door handle 21.

Further, since the outer surface of the door handle 21 is substantially flush with the outer surfaces of the outer panel 11, the front beltline lace 6 and the rear beltline lace 7 when the door handle 21 is at rest, the smoothness of the door surface is sufficiently ensured, whereby the air resistance during running is reduced.

We claim:

1. A door handle to be provided on a door of a vehicle for releasing a door lock mechanism characterized in that the vehicle is provided with a beltline lace extending in the longitudinal direction of the vehicle body along the upper edge of the outer panel of the vehicle door on the side of the vehicle body through the outer side of the door, the beltline lace being cut at a part of the door, and said door handle is positioned at the beltline lace cut part of the door at which the belt line is cut.

2. A door handle as defined in claim 1 in which said beltline lace is cut at a rear end portion of the door.

3. A door handle as defined in claim 2 in which said door is provided at the rear end thereof with a sash for supporting a windowpane, and said door handle is mounted on the sash to be pivoted between a rest position and an operative position, the door handle being pivoted to the operative position when the door lock mechanism is to be released.

4. A door handle as defined in claim 3 in which said door handle is supported on a base member to be exposed outside the vehicle body, the base member being housed inside the door.

5. A door handle as defined in claim 4 in which said door handle is mounted to be pivoted on a support shaft extending upward from the base member.

6. A door handle as defined in claim 4 in which said sash has a side plate portion and a flange is formed on the front end portion of the said plate portion to extend outward, said base member being bolted on the side plate portion and the flange.

7. A door handle as defined in claim 2 in which said door comprises an outer panel and an inner panel, and the outer panel is provided with a cutaway portion at a part corresponding to the beltline lace cut part.

8. A door handle as defined in claim 1 in which said door handle is mounted to be movable between a rest position and an operative position, the door handle being moved to the operative position when the door lock mechanism is to be released, and is positioned so that the outer surface thereof is substantially flush with the outer surface of the beltline lace when the door handle is in the rest position.

9. A door handle as defined in claim 8 in which said door handle is mounted to be pivoted about a vertical axis.

10. A door handle as defined in claim 2 in which said door comprises an outer panel and an inner panel and the rear end portion of the outer panel extends rearward to overlap the outer surface of a body panel defining the opening to be closed by the door, said door handle being positioned to cover the rear end portion of the outer panel at the rear end portion thereof.

11. A door handle as defined in claim 10 in which said door handle is provided at the rear end portion thereof with a finger portion to which a finger or fingers are applied when opening the door.

12. A door handle as defined in claim 11 in which said body panel is provided with a recess at a portion opposed to the finger portion of the door handle.

13. A door handle as defined in claim 10 in which said door handle is mounted to be pivoted about a vertical axis.

14. A door handle as defined in claim 10 in which the rear end face of the door handle is substantially in alignment with the rear end face of the outer panel.

15. A door handle as defined in claim 1 in which said door comprises an inner panel and an outer panel, and said beltline lace is shaped like a channel open downward in cross-section and rests on the upper edge portion of the outer panel.

16. A door handle as defined in claim 15 in which said outer surface of the beltline lace is substantially flush with the outer surface of the beltline lace.

* * * * *